(12) United States Patent
Petro et al.

(10) Patent No.: US 7,573,170 B2
(45) Date of Patent: Aug. 11, 2009

(54) MOTOR MODULES FOR LINEAR AND ROTARY MOTORS

(75) Inventors: John Patrick Petro, Los Altos, CA (US); Ken George Wasson, Foster City, CA (US)

(73) Assignee: NovaTorque, Inc., North Highlands, CA (US)

( * ) Notice: Subject to any disclaimer, the term of this patent is extended or adjusted under 35 U.S.C. 154(b) by 187 days.

(21) Appl. No.: 11/543,521

(22) Filed: Oct. 4, 2006

(65) Prior Publication Data

US 2007/0075593 A1    Apr. 5, 2007

Related U.S. Application Data

(60) Provisional application No. 60/724,053, filed on Oct. 5, 2005, provisional application No. 60/773,500, filed on Feb. 14, 2006.

(51) Int. Cl.
*H02K 21/12* (2006.01)

(52) U.S. Cl. .............................. 310/156.38; 310/156.43; 310/12

(58) Field of Classification Search ............. 310/12–15, 310/156.26, 156.38, 156.43, 156.49, 156.55, 310/156.5
See application file for complete search history.

(56) References Cited

U.S. PATENT DOCUMENTS

| | | | |
|---|---|---|---|
| 3,356,425 A * | 12/1967 | Carriere et al. ............. | 310/90.5 |
| 4,540,277 A | 9/1985 | Mayer | |
| 4,595,870 A | 6/1986 | Chitayat | |
| 4,644,199 A | 2/1987 | Langley | |
| 5,280,677 A | 1/1994 | Kubo | |
| 5,323,712 A | 6/1994 | Kikuiri | |
| 5,731,641 A | 3/1998 | Botos | |
| 6,163,091 A | 12/2000 | Wasson | |
| 6,236,124 B1 * | 5/2001 | Sekiyama et al. ............. | 310/12 |
| 6,278,203 B1 | 8/2001 | Novak | |
| 6,407,471 B1 | 6/2002 | Miyamoto | |
| 6,803,682 B1 | 10/2004 | Thirunarayan | |
| 6,884,601 B1 * | 4/2005 | Flohe et al. ................... | 310/12 |
| 6,919,653 B2 | 7/2005 | Thirunarayan | |

FOREIGN PATENT DOCUMENTS

JP    H6-14521    1/1994

* cited by examiner

*Primary Examiner*—Thanh Lam
(74) *Attorney, Agent, or Firm*—Kokka & Backus, PC

(57) ABSTRACT

A motor module, method, apparatus and system for implementing linear and rotary motors, such as relatively large rotary motors, are disclosed. In one embodiment, an electrodynamic machine can include magnets having angled magnetic surfaces and regions of predetermined magnetic polarization. The magnets can include a first array and a second array of magnets arranged in a direction of motion. Also included are groups of field pole members arranged adjacent to the first array and the second array of magnets. The field pole members include angled flux interaction surfaces, which can be formed at the ends of the field pole members to confront the angled magnetic surfaces. In combination, the angled flux interaction surfaces and the angled magnetic surfaces define air gaps. As such, the angled flux interaction surfaces are configured to magnetically couple the field pole members to the magnets to form either a linear or rotary motor.

5 Claims, 12 Drawing Sheets

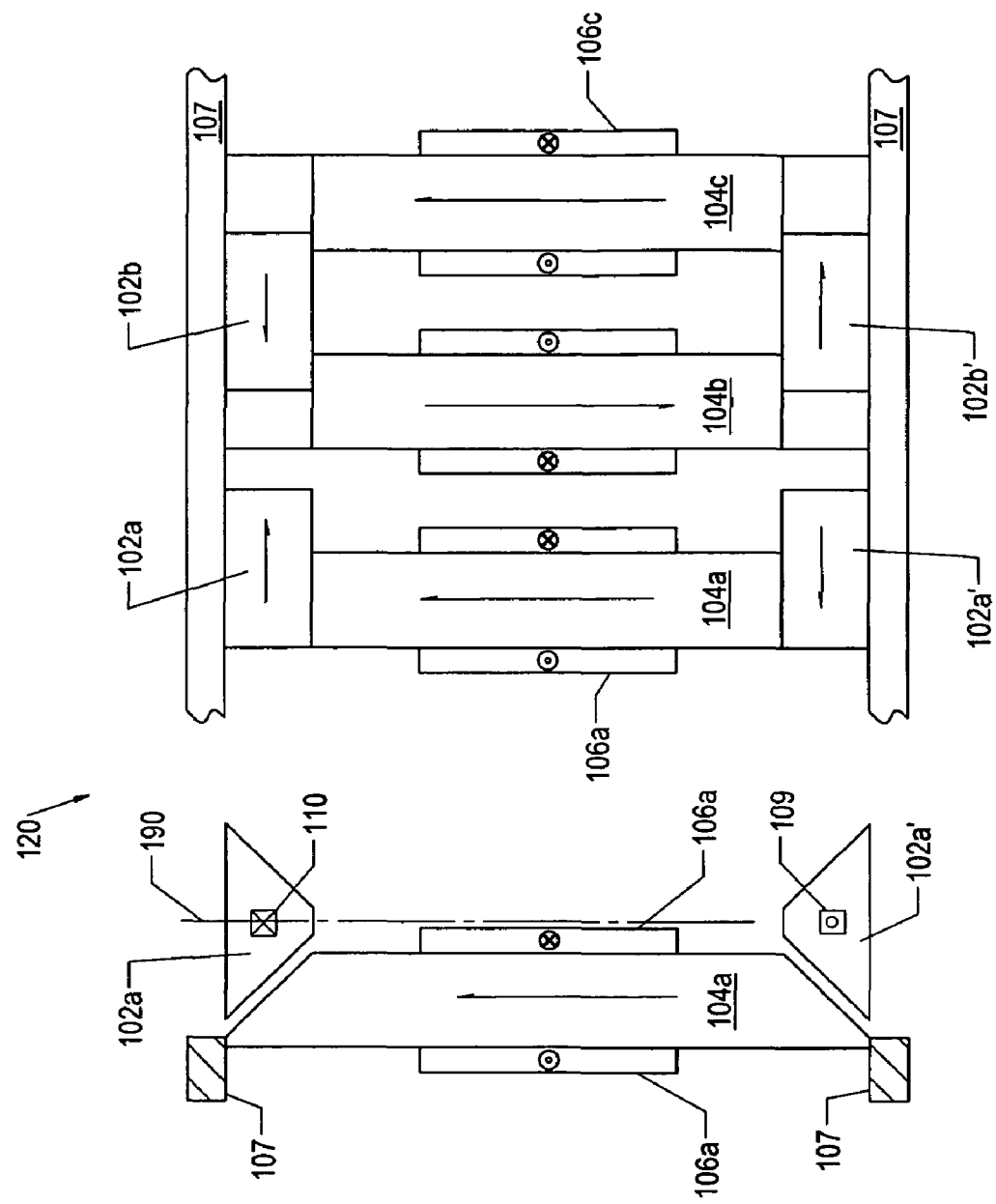

MOTOR MODULES FOR LINEAR AND ROTARY MOTORS

CROSS REFERENCE TO RELATED APPLICATIONS

This application claims the benefit of U.S. Provisional Application No. 60/724,053, entitled "Motor Modules for Linear and Rotary Motors" and filed on Oct. 5, 2005 with Attorney Docket No. QUIZ-005/00US, the disclosure of which is incorporated herein by reference in its entirety. This application also incorporates by reference the following applications in their entirety for all purposes: (1) U.S. Provisional Application No. 60/622,258, entitled "Rotor-Stator Structure for Electric Motors and Generators," filed on Oct. 25, 2004; (2) U.S. Nonprovisional Application No. 11/021,417, entitled "Rotor-Stator Structure for Electrodynamic Machines," filed on Dec. 23, 2004 and issued as U.S. Pat. No. 7,061,152 on Jun. 13, 2006; (3) U.S. Nonprovisional Application No. 11/255,404, entitled "Rotor-Stator Structure for Electrodynamic Machines," filed on Oct. 20, 2005 with Attorney Docket No. QUIZ-001/02US; and (4) U.S. Provisional Application No. 60/773,500, entitled "Field Pole Member for Electrodynamic Machines," filed on Feb. 14, 2006 with Attorney Docket No. QUIZ-002/00US.

BRIEF DESCRIPTION OF THE INVENTION

This invention relates generally to linear and large electrodynamic machines and the like, and more particularly, to a motor module configured to implement linear and rotary motors, such as motors having relatively large dimensions.

BACKGROUND OF THE INVENTION

While traditional linear and large rotary motor structures are functional, they have several drawbacks in their implementation. Linear motors, which are also commonly referred to as linear actuators, generally fall into two categories: moving coil and moving magnet. Moving coil actuators (i.e., linear motors) generally produce less force per ampere-turn ("AT") than the moving magnet category. Other drawbacks of conventional moving coil linear motors include poor thermal dissipation properties and relatively high bias forces, which are created by the current-carrying lead wires and cables. By contrast, moving magnet linear motors are generally free from such bias and can produce higher force per ampere-turn. But moving magnet linear motors have several drawbacks, too. For example, the positioning of the magnets relative to back-iron structures can contribute to some instability in motor operation, such as cogging. Another drawback is that the movements of the magnet structure can temporarily magnetize back-iron structures. Typically, a current controller is required to compensate for the unwanted effects of back-iron magnetization to more precisely manage the positioning of the actuator.

Rotary motors, which are another type of electric motor, include magnetic poles that are positioned at relatively large diameters about (or radial distances from) a rotor shaft. These magnetic poles, as well as the permanent magnets giving rise to those magnetic poles, are typically arranged coaxially about the shaft alternating in polarity and are positioned adjacent to magnetic field poles. An armature disk usually supports the permanent magnets as separate magnets in a plane perpendicular to the rotor shaft. Structures such as this are designed based on a certain tenet of electric motor design. According to this tenet, an increase in output torque is achieved by increasing the radial distance between the magnetic poles and the rotor shaft. Consequently, the magnetic poles of this type of electric motor are increasingly being positioned at larger distances from the rotor shaft to increase the torque arm distance from the axis of rotation to the air gaps, thereby increasing the output torque. A drawback to this approach is that additional materials are consumed in forming larger motor structures to accommodate the larger torque arm distance, such as those structures that are used to form magnetic flux return paths. These magnetic flux return paths are typically formed using "back-iron" to complete a larger flux path, which is generally circuitous in nature. By adding back-iron to complete a magnetic circuit, the magnetic material volume through which the magnetic flux passes increases, which detrimentally tends to increase the hysteresis and eddy current losses, both of which can be collectively referred to as "core losses." Further, the addition of back-iron to complete a magnetic circuit increases the length of the magnetic flux path, thereby exacerbating core losses. Another drawback to motors of this type is that the motor volume increases as the magnetic poles are positioned farther from the shaft, which in turn, limits the available applications and uses for this type of motor.

"Back-iron" is a term commonly used to describe a physical structure (as well as the materials giving rise to that physical structure) that is often used to complete an otherwise open magnetic circuit. Back-iron structures are generally used only to transfer magnetic flux from one magnetic circuit element to another, such as either from one magnetically permeable field pole to another, or from a magnet pole of a permanent magnet to a magnet pole of another permanent magnet, or both. Further, "back-iron" structures are not generally formed to accept an associated ampere-turn generating element, such as one or more coils.

In view of the foregoing, it would be desirable to provide improved techniques and structures that minimize one or more of the drawbacks associated with conventional linear and rotary motors so as to, for example, increase either linear force output or torque output as well as to enhance efficiency either on a per unit size or per unit weight basis, or both.

SUMMARY OF THE INVENTION

Disclosed are a motor module, method, apparatus and system for implementing linear and rotary motors, such as rotary motors having relatively large dimensions. According to various embodiments of the invention, linear and rotary motors that implement motor modules can deliver increased force (or torque) either per unit volume or unit mass, thereby providing electric motors with reduced sizes and weights while delivering performance comparable to traditionally large motors. In accordance with at least one embodiment of the invention, motor modules include magnets and active field pole members that can form either a linear or rotary motor. For example, an electrodynamic machine can include magnets having angled magnetic surfaces and regions of predetermined magnetic polarization. The magnets can include a first array and a second array of magnets arranged in a direction of motion. The electrodynamic machine can also include groups of field pole members arranged adjacent to the first array of magnets and the second array of magnets. The field pole members can have angled flux interaction surfaces formed at the ends of the field pole members to confront the angled magnetic surfaces. The angled flux interaction surfaces and the angled magnetic surfaces define air gaps. As such, the angled flux interaction surfaces are configured to magnetically couple the field pole members to the magnets. In a specific embodiment, one or more coils can be disposed about each of the field pole members to form active field pole members for generating ampere-turn ("AT") flux.

Advantageously, the angled magnetic surfaces and/or angled flux interaction surfaces facilitate reducing the length of magnetic flux paths and/or straightening those paths through the field pole members. In some embodiments, the field pole members implement substantially straight paths to provide a relatively low magnetic reluctance flux path inside the field pole members, as compared to conventional magnetic return path designs that require magnetic flux to turn sharply, such as at an angle of ninety-degrees or greater, to enter or exit field pole regions. Further, substantially straight field pole members can also provide relatively short magnetic flux path portions between air gaps in some embodiments. As such, the combination of the groups of field pole members, the first array of magnets, and the second array of magnets can form either a linear motor or a rotary motor that operates with low magnetic losses and increased efficiency.

In at least one embodiment, the electrodynamic machine excludes back-iron as a return path for any portion of a flux path associated with a group of the field pole members, thereby increasing either torque per unit volume of a rotary motor or increasing actuation force per unit volume of a linear actuator. Excluding back-iron also enhances efficiency per unit size (or unit weight) as well as reduces manufacturing costs. In another embodiment, at least one of the field pole members is substantially straight. Substantially straight field pole members can provide a relatively short magnetic flux path between the magnets, which, in turn, may be accompanied by a reduction in the volume of magnetically permeable material as compared to the use of back-iron in some traditional stator structures. Elimination of back-iron also reduces the volume of magnetically permeable material through which magnetic flux is conducted, thereby decreasing hysteresis losses and eddy current losses (collectively known as "core losses") as well as decreasing the amount of the materials used for manufacturing a linear or rotary motor in accordance with the various embodiments of the invention.

In one embodiment, each of the angled magnetic surfaces further includes a magnetic surface of principal dimension substantially at an acute angle to either a reference plane that is parallel to the direction of motion and extends between two field pole members (if the electrodynamic machine is a linear motor), with the reference plane being substantially equidistant from the two field pole members, or an axis of rotation (if the electrodynamic machine is a rotary motor). In a specific embodiment, each of the groups of field pole members includes one or more coils to form an active group of active field pole members that is configured to magnetically couple via a subset of the air gaps to at least one magnet in the first array and at least one magnet in the second array to form at least one closed flux path in association with the active group. In a linear motor, the groups of field pole members, the first array of magnets, and the second array of magnets can be arranged in a line, such as in either a straight line or a curved line. As such, the angled magnetic surfaces can be coextensive with a plane at an acute angle to a reference plane that is parallel to the direction of motion (or portions thereof, if the line is curved). In a rotary motor or generator, the groups of field pole members, the first array of magnets, and the second array of magnets can be arranged coaxially to an axis of rotation. In this case, the angled magnetic surfaces can be coextensive with a curved surface at an acute angle with the axis of rotation (e.g., a portion of a conical-like surface of a cone centered on an axis of rotation). In at least one specific embodiment, the electrodynamic machine can include: at least one group of field pole members that include coils to form a group of active field pole members, a subset of the air gaps, a first array magnet (from the first array of the magnets), and a second array magnet (from the second array of the magnets). As such, at least two of the active field pole members, the subset of air gaps, the first array magnet, and the second array magnet are sufficient to form a closed flux path that passes through at least two of the active field pole members in different directions and through the first array magnet and the second array magnet in substantially opposite directions.

BRIEF DESCRIPTION OF THE FIGURES

The invention and its various embodiments are more fully appreciated in connection with the following detailed description taken in conjunction with the accompanying drawings, in which:

FIGS. 1A to 1G illustrate motor modules (and portions thereof) in accordance with various embodiments of the invention;

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Definitions

Figure 1A:
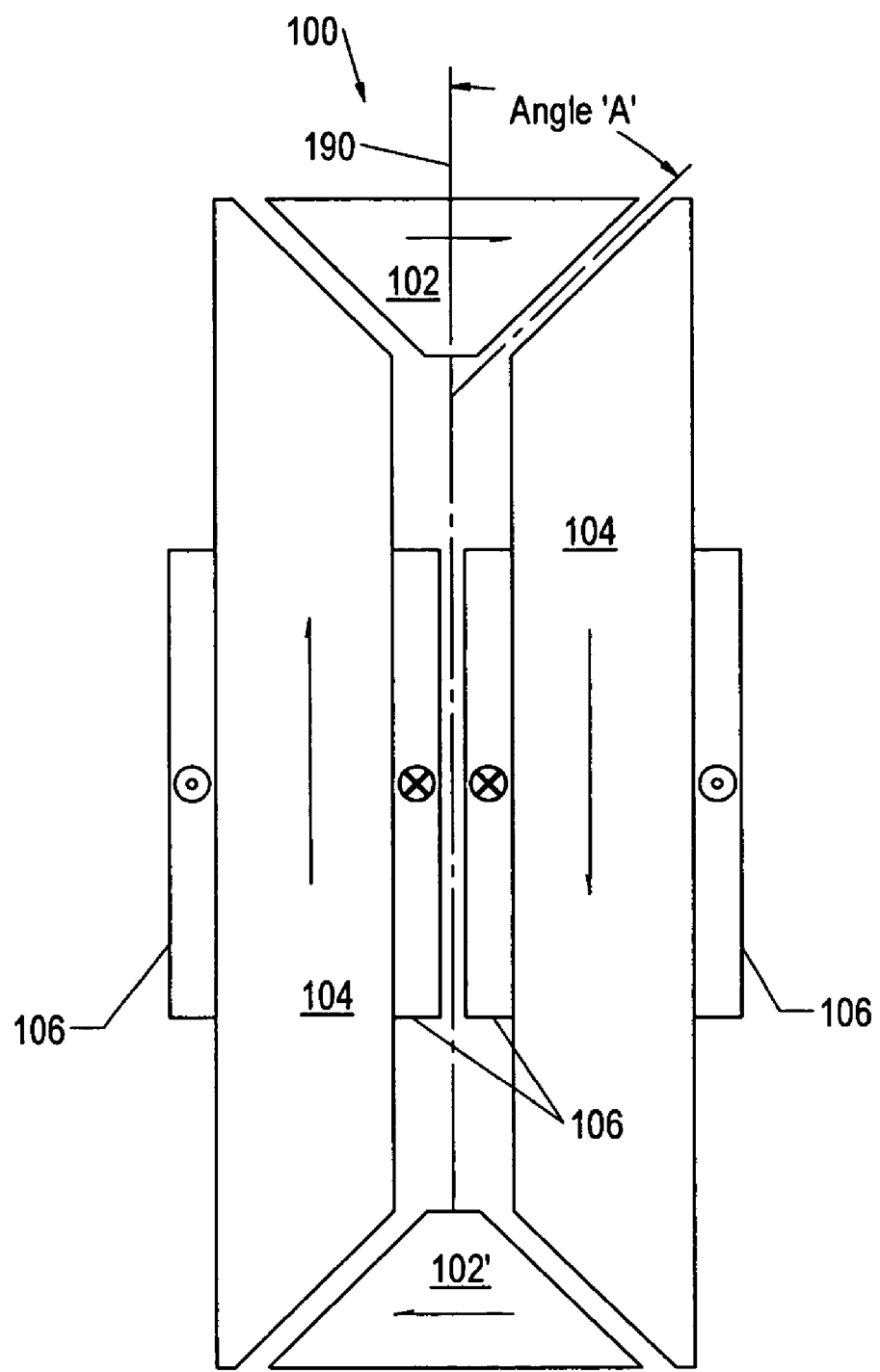

The following definitions apply to some of the elements described with respect to some embodiments of the invention. These definitions may likewise be expanded upon herein.

As used herein, the term "air gap" refers to a space, or a gap, between a magnet surface and a confronting pole face. Such a space can be physically described as a volume bounded at least by the areas of the magnet surface and the pole face. An air gap functions to enable relative motion between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally to a portion of a field pole member around which a coil is wound.

As used herein, the term "core" refers to a portion of a field pole member where a coil is normally disposed between pole shoes and is generally composed of a magnetically permeable material for providing a part of a magnetic flux path.

As used herein, the term "field pole member" refers generally to an element composed of a magnetically permeable material and being configured to provide a structure around which a coil can be wound (i.e., the element is configured to receive a coil for purposes of generating magnetic flux). In particular, a field pole member includes a core (i.e., core region) and at least one pole shoe, each of which is generally located near a respective end of the core. Without more, a field pole member is not configured to generate ampere-turn flux. In some embodiments, the term "field pole member" can be described generally as a "stator-core."

As used herein, the term "active field pole member" refers to an assemblage of a core, one or more coils, and at least two pole shoes. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers to a body that produces a magnetic field externally unto itself. As such, the term magnet includes permanent magnets, electromagnets, and the like. The term magnet can also refer to internal permanent magnets ("IPMs"), surface mounted permanent magnets ("SPMs"), and the like.

As used herein, the term "motor" generally refers to an electrodynamic machine that is configured to convert electrical energy into mechanical energy.

As used herein, the term "magnetically permeable" is a descriptive term that generally refers to those materials having a magnetically definable relationship between flux density ("B") and applied magnetic field ("H"). Further, "magnetically permeable" is intended to be a broad term that includes, without limitation, ferromagnetic materials such as common lamination steels, cold-rolled-grain-oriented (CRGO) steels, powder metals, soft magnetic composites ("SMCs"), and the like.

As used herein, the term "pole face" refers to a surface of a pole shoe that faces at least a portion of the flux interaction region (as well as the air gap), thereby forming one boundary of the flux interaction region (as well as the air gap). In some embodiments, the term "pole face" can be described generally as including a "flux interaction surface." In one embodiment, the term "pole face" can refer to a "stator surface."

As used herein, the term "pole shoe" refers to that portion of a field pole member that facilitates positioning a pole face so that it confronts a rotor (or a portion thereof), thereby serving to shape the air gap and control its reluctance. The pole shoes of a field pole member are generally located near one or more ends of the core starting at or near a coil region and terminating at the pole face. In some embodiments, the term "pole shoe" can be described generally as a "stator region."

As used herein, the term "soft magnetic composites" ("SMCs") refers to those materials that are comprised, in part, of insulated magnetic particles, such as insulation-coated ferrous powder metal materials that can be molded to form an element of the stator structure of the present invention.

As used herein, the term "angled," in at least one embodiment, refers to a characteristic of a surface (or a portion thereof) that faces at least a portion of the flux interaction region (as well as the air gap). The surface can be a flux interaction surface of a pole shoe (e.g., a pole face) or a surface of a magnet. An "angled surface," in at least one embodiment, refers to a surface that is at an acute angle relative to either an axis of rotation or a centered reference plane ("reference plane") parallel to the direction of motion and passing through one or more mechanical or geometric centers of either the magnets or the field pole members of a motor module. In some cases, the centered reference plane can include the centroids (i.e., the centers of mass) of the magnets. In at least one embodiment, an "angled surface" refers to a surface that is at an acute angle relative to a plane that includes a direction vector and a longitudinal axis of a field pole member. In one embodiment, a field pole member has a length dimension associated with the direction of the longitudinal axis, the length dimension being greater than a width dimension. As such, the longitudinal axis can be a straight line that passes lengthwise through an approximate center of a field pole member, regardless of whether the field pole member is straight. In one embodiment, the direction vector can be described as an instantaneous direction vector that indicates a direction of motion, such as in three-dimensional space, at any point in time for one or more points associated with either a magnet (if the field pole members are stationary) or a field pole member (if the magnets are stationary). An "angled air gap," at least in one embodiment, refers to an air gap that is at an angle that is non-orthogonal to a predominant direction of a flux path portion in either a field pole member or a magnet. For example, the predominant direction of a flux path portion in a magnet is substantially parallel to the direction of magnetic polarization, whereas the predominant direction of the flux path portion in a field pole member is substantially parallel to the direction of AT-generated flux in the core. The angled air gap can include any angle relative to the predominant direction of the flux path portion, except within 5 degrees of 0, 90, 180, 270, and 360 degrees. Note that an "angled surface" is generally coextensive (i.e., it is equal or coincident in space or scope, and/or has the same boundaries of a reference surface, plane, etc.) with either a plane that is at an angle to the reference plane in linear motors, or a curved surface (e.g., a conical surface portion) having an acute angle relative to the axis of rotation in rotary motors.

As used herein, the term "field pole module" refers to an assemblage of field pole members and/or active field pole members arranged to magnetically couple with the magnets of one or more magnet arrays to form a motor module. The field pole module can also be configured to impart a magnetic force on the magnets to produce motion. Multiple field pole modules can be positioned to magnetically couple with the one or more magnets to form a motor structure, such as a linear motor or a rotary motor.

As used herein, the term "magnet array" refers to a collection of magnets arranged so that one or more magnets of a magnet array can interact with a collection of field pole modules to form a linear or rotary motor. In linear motors, the magnet array can be arranged linearly (i.e., in a straight line or a variant thereof, such as a curved line). In rotary motors, the magnet array can be generally concentric to an axis of rotation.

As used herein, the term "motor module" refers to a field pole module configured to magnetically interact with at least one group of one or more magnets in one or more magnet arrays to produce a torque or a linear force.

As used herein, the term "field pole module pitch" refers to a distance between field pole members in neighboring field pole modules. For example, the distance can be measured from one point (e.g., the mechanical/geometric center) of one field pole module (or field pole member) to a similar point (e.g., the mechanical/geometric center) of an adjacent field pole module. In a linear motor, the distance is generally a linear distance, but in a rotary motor, this distance is measured along an arc. Note that in some applications (e.g., when using a linear motor), the magnet array pitch can vary along the developed length of the motor.

As used herein, the term "magnet array pitch" refers to a distance between adjacent magnets in a magnet array. For example, the distance can be measured from a point (e.g., the mechanical/geometric center) of one magnet to a similar point (e.g., the mechanical/geometric center) of an adjacent magnet. In a linear motor, the distance is generally a linear distance, but in a rotary motor, this distance is measured along an arc. Note that the magnet array pitch can be less than, the same as, or greater than the field pole module pitch. Note also that in some applications (e.g., when using a linear motor), the field pole module pitch can vary along the developed length of the motor.

Discussion

Various embodiments of the invention provide for motor modules as basic structures for constructing electrodynamic machines, such as linear motors and rotary motors having relatively large motor dimensions. Advantageously, the motor modules of the various embodiments provide desirable flux paths without generally requiring the use of back-iron. Examples of such flux paths and the structures providing for those flux paths are generally described in the U.S. provisional and nonprovisional patent applications and issued patents identified in the section titled "Cross Reference to Related Applications." Motor modules of at least one embodiment can provide a motor that conserves material used in manufacturing.

According to various embodiments of the invention, a motor module includes magnets and active field pole members that can aggregate with other motor modules to form either a linear or rotary motor. In one embodiment, an electrodynamic machine can include magnets having angled magnetic surfaces and regions of predetermined magnetic polarization, with the magnets including a first array of magnets as well as a second array of magnets. Both arrays can be arranged in a linear or rotational direction of motion. The electrodynamic machine can also include groups of field pole members arranged adjacent to the first and second arrays of magnets. One or more of the field pole members can have angled flux interaction surfaces formed at the ends of the field pole members to confront the angled magnetic surfaces. The angled flux interaction surfaces and the angled magnetic surfaces define air gaps. As such, the angled flux interaction surfaces are configured to magnetically couple the field pole members to the magnets. In a specific embodiment, one or more coils can be disposed on the field pole members to form active field pole members for generating ampere-turn ("AT") flux. The combination of the groups of field pole members, the first array of magnets, and the second array of magnets can form either a linear motor or a rotary motor that can operate with low magnetic losses and increased efficiency.

Advantageously, the angled magnetic surfaces and/or angled flux interaction surfaces facilitate reducing the length of magnetic flux paths and/or straightening those paths through the field pole members. In some embodiments, the field pole members implement substantially straight paths to provide a relatively low reluctance flux path inside those field pole members, as compared to conventional magnetic return path designs that require magnetic flux to turn sharply, such as at an angle of ninety-degrees or greater, to enter or exit field pole regions, or to accommodate orthogonal geometries of structures that constitute field pole regions.

In at least one embodiment, the electrodynamic machine excludes back-iron as a return path for any portion of a flux path associated with a group of the field pole members, thereby increasing torque per unit volume of a rotary motor or increasing actuation force per unit volume of a linear actuator. Excluding back-iron also enhances efficiency per unit size (or unit weight) and reduces manufacturing costs. In another embodiment, at least one of the field pole members is substantially straight. Substantially straight field pole members can provide a relatively short magnetic flux path between the magnets, which, in turn, may be accompanied by a reduction in the volume and mass of magnetically permeable material as compared to the use of back-iron in some traditional stator structures. Elimination of back-iron also reduces the volume of magnetically permeable material through which magnetic flux is conducted, thereby decreasing hysteresis losses and eddy current losses (collectively known as "core losses") as well as the materials for manufacturing a linear or rotary motor in accordance with the various embodiments of the invention.

For the discussions of certain embodiments of the invention that follow, motor modules can be characterized as having or being related to a specific group of magnets for purposes of illustrating the flux relationships between the field pole members and the magnets. But note that the magnets constitute part of one or more magnet arrays. As such, each of the magnets represents multiple magnets that can magnetically interact with the flux interaction surfaces of one group of field pole members. In operation, the magnets of a magnet array can move relative to the position of the one group of field pole members and need not be associated with any particular group of field pole members at any given moment. Note that the following discussions that relate to rotary motors are applicable to "large" motors. One example of a large motor is a rotary motor that has a diameter greater than 20 centimeters and/or can deliver more than seven kilowatts of output power. In various embodiments of the invention, motor modules can be used to construct other large motors that have diameters less than 20 centimeters and/or deliver less than seven kilowatts.

Figure 2:
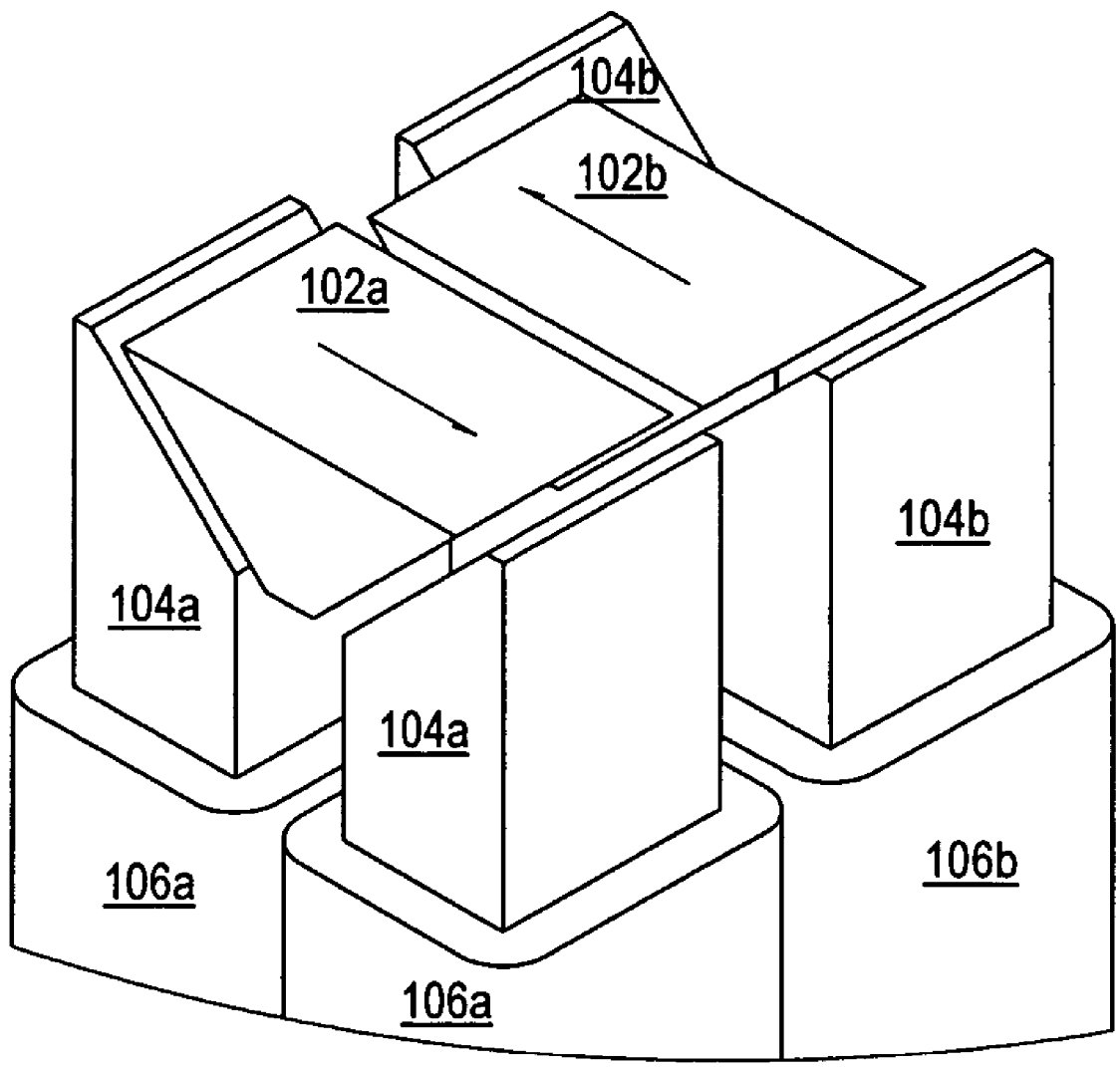
FIG. 2 is a perspective view of a motor module being positioned adjacent to a neighboring motor module, according to an embodiment of the invention.
Figure 3:
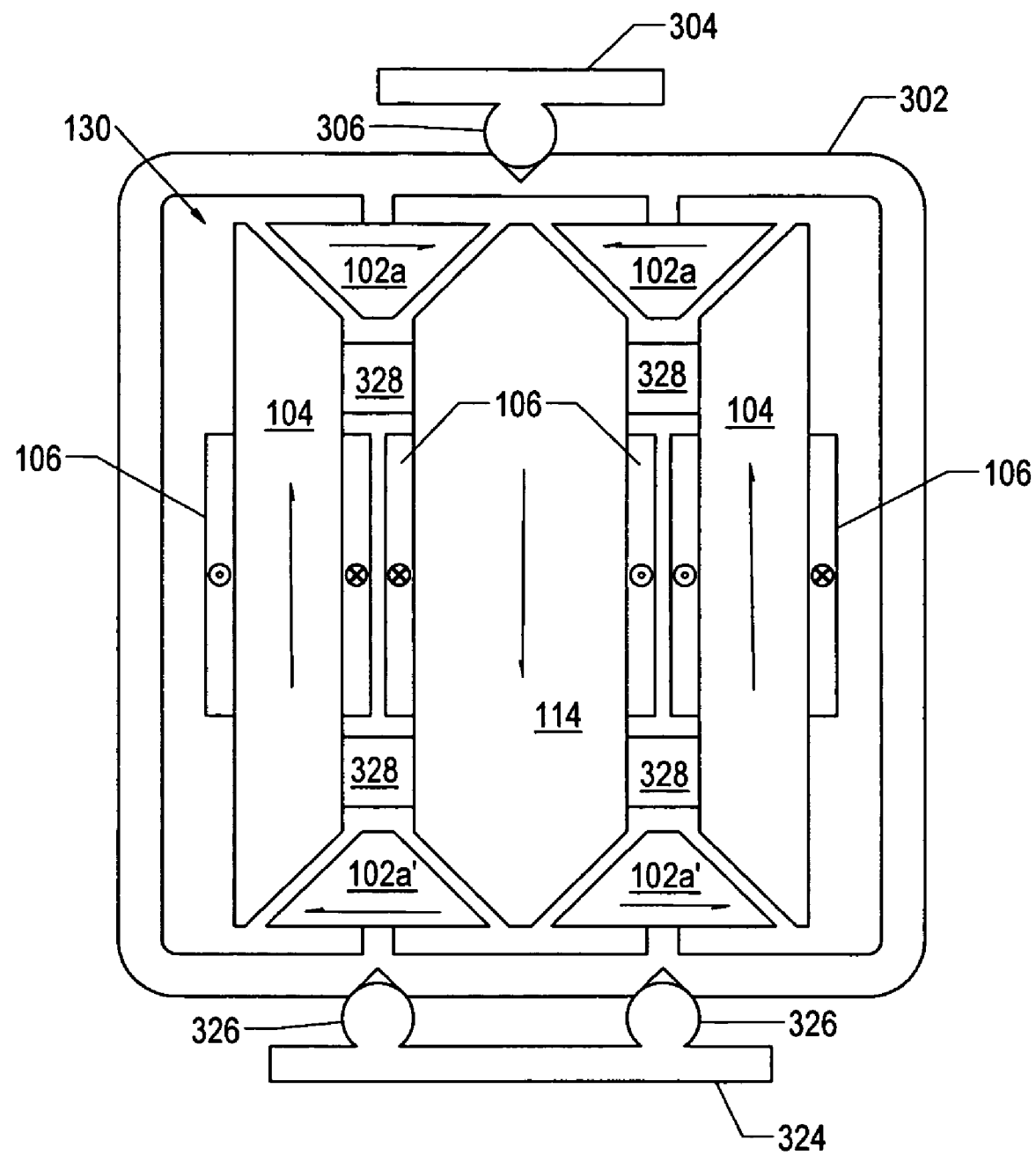
FIG. 3 is an end view of one of a number of motor modules disposed in a linear motor, according to an embodiment of the invention.

FIGS. 1A to 1G illustrate motor modules in accordance with various embodiments of the invention. Note that physical attachments between motor modules and any load are not depicted in these FIGS., but those skilled in the art should understand how to implement such attachments. FIG. 1A illustrates an example of a motor module, according to one embodiment of the invention. Motor module 100 includes field pole members 104, which form a field pole module, and magnets 102, which are part of a magnet array, for producing a flux path in the general directions depicted by the flux arrows. In this example, field pole members 104 include conductors 106 for generating ampere-turn flux. These conductors are shown as coils 106. In one embodiment, magnets 102 are shaped as shown in FIG. 2. But in other embodiments, magnets 102 can be of any shape. In some cases, magnets are rectangular in shape as viewed externally from top, bottom or sides of a linear motor, but trapezoidal in shape as viewed in planes that are perpendicular to the linear direction of motion. For example, the end view of FIG. 3 illustrates magnets as having trapezoidal shapes. In a specific embodiment, the magnets can be polarized either perpendicular to a plane including centerline 190 or longitudinally, which is in the direction of travel. The plane that includes centerline 190 bisects the field pole module through magnets 102 and extends in the direction of travel (i.e., in and out of the page illustrating FIG. 1A). Note that in linear motors, the direction of travel is either a straight or a curved line, whereas in rotary motors the direction of travel is circular. In some cases, the magnetic polarization of magnets 102 is substantially perpendicular to the plane including centerline 190. This orientation can provide optimal design options and can be used to implement various motor sizes (e.g., relatively large sized motors) and linear motors. Field pole members 104 can be configured to have flux interaction surfaces, for example, at angle "A," (e.g., 45°) from a plane including centerline 190 that is parallel to the direction of linear motion and bisects motor module 100 through magnets 102.

Figure 6:
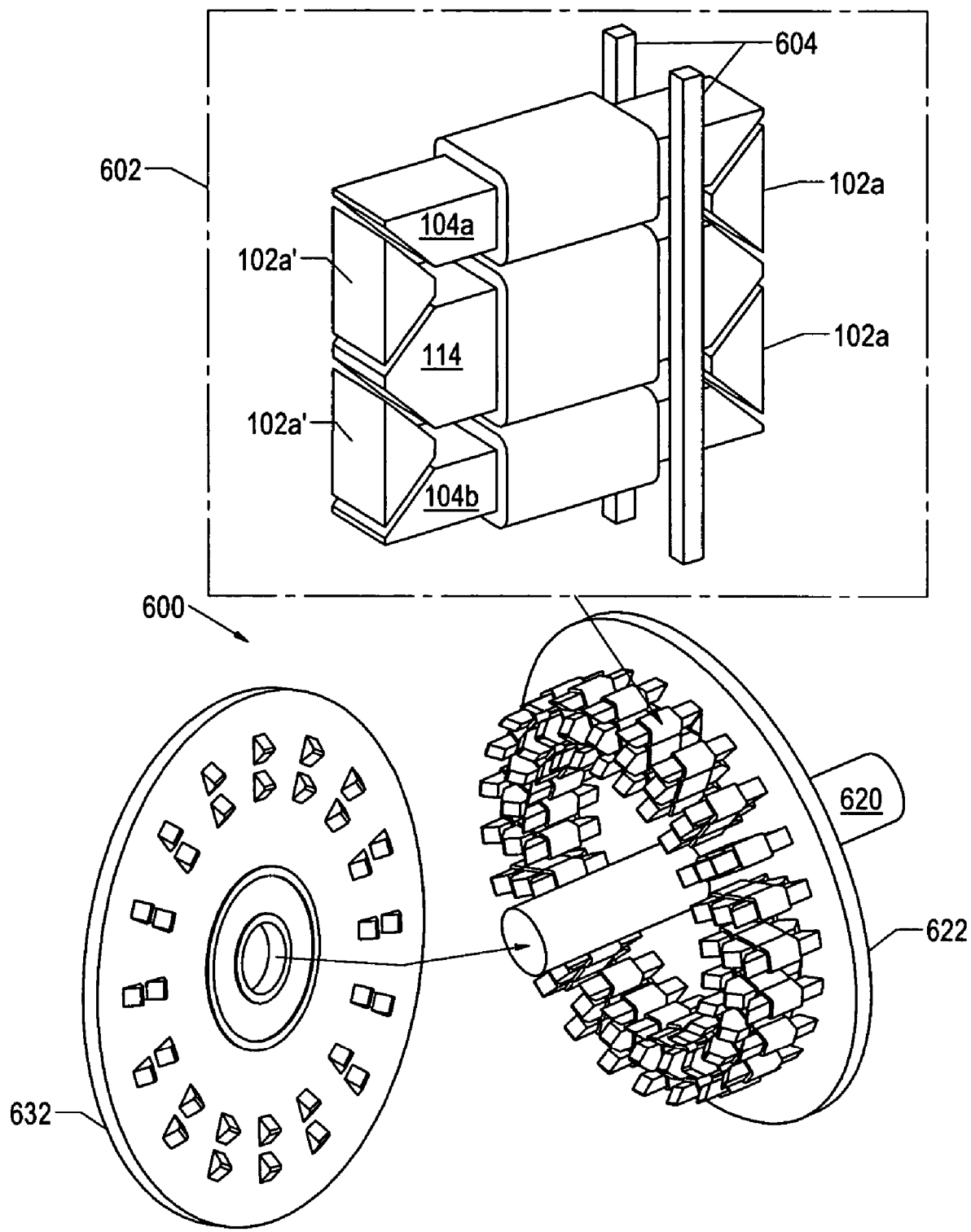
FIG. 6 is a perspective view of a relatively large rotary motor implementing motor modules equivalent to that shown in FIG. 1D, according to an embodiment of the invention.

In at least one embodiment, field pole members 104 can be implemented to form a rotary motor. One example of a rotary motor that can implement motor modules is shown in FIG. 6.

In this case, field pole members 104 of motor module 100, which can be depicted as motor module 602 (FIG. 6), can be configured to have their flux interaction surfaces oriented at angle "A" from a centerline 190 that lies on a cylindrical surface and substantially bisects motor module 100 through magnets 102. In particular, centerline 190 can conceptually lie either along a radius from, or on a cylinder oriented about, an axis of rotation.

Field pole members 104 can be spaced either linearly to construct linear motors or in a circular configuration to construct relatively large rotary motors. In either case, field pole members 104 can be spaced at intervals (i.e., at a specific field pole module pitch) that correspond with the electrical phase (ampere-turn, or "AT") generated fields so that the AT-generated flux can effectively pass transversely (in linear motors) or radially (in rotary motors) across the magnets. Note that the magnet array pitch can differ from the field pole module pitch. In at least one embodiment, a given magnet can be long enough to cover an adjacent flux interaction surface (i.e., pole face) in one group of field pole members, and partially cover another flux interaction surface (i.e., another pole face) in a neighboring group of field pole members. The term "neighboring group" can refer to a following set of field pole members in the next motor module, which is not shown. In one embodiment, field pole members 104 are formed from cold rolled grain oriented ("CRGO") electrical steel laminations.

In at least one embodiment, a linear motor may be constructed using a number of field pole modules, each field pole module being centered on a plane that includes a centerline 190 and spaced apart along that plane in accordance with a field pole module pitch. The magnet arrays are depicted in the end view in FIG. 1A as magnet 102 and magnet 102', and in the perspective view in FIG. 2 as magnet 102a and magnet 102b. In at least one embodiment, the magnet arrays are centered in the plane including centerline 190 and are positioned to magnetically communicate with field pole members 104 to produce a closed flux path, as depicted by flux arrows in FIG. 1A. Note that while the magnets in the magnet arrays are spaced apart in the plane including centerline 190, the magnet array pitch of those magnets is not necessarily the same spacing (i.e., the field pole module pitch) for the groups of field pole members 104 (i.e., field pole modules). The magnet array pitch and the field pole module pitch are further explained in the discussion for FIG. 5.

FIGS. 1B and 1C illustrate another example of a motor module, according to another embodiment of the invention. In this example, one of field pole members 104 of motor module 100 of FIG. 1A is omitted. In this case, the magnet polarization is in the direction of magnet motion along the plane that includes centerline 190, and alternates North and South polarity for each of the magnet arrays as shown in FIG. 1C. For example, the North polarity is shown as symbol 109 in FIG. 1B and the South polarity is shown as symbol 110 in FIG. 1B. The return path for the flux then can be the adjacent field pole members in a line or in an arc. In at least one embodiment, a support structure such as continuous members 107 of FIGS. 1B and 1C, or an equivalent structure, can be implemented to support the field poles in the transverse direction. In the case of a rotary motor, those having ordinary skill in the art should appreciate that continuous members 107 each take the form of a continuous ring (not shown).

As shown in FIG. 1C, the flux from one end of a given magnet 102a' (depicted as a "bottom" magnet) can pass through the adjacent field pole member 104a in a group of field pole members. Magnet 102a (depicted as a "top" magnet) can have an opposite polarity in the direction of travel (or motion) from the "bottom" magnet 102a' of motor module 120. Note that motor module 120 of FIG. 1B has one field pole member 104 per field pole module, and does not include a second field pole member 104 as in FIG. 1A or a center field pole 114, as shown in motor module 130 of FIG. 1D. In the example shown in FIG. 1C, a flux path extends from North pole end of "top" magnet 102b', which is adjacent a flux interaction surface of active field pole member 104b across an air gap to a top flux interaction surface (i.e., a top pole face) of an active field pole member 104b. The flux path continues down active field pole member 104b to the other end near magnet 102b', across an air gap to the South pole of "bottom" magnet 102b', through that magnet in the linear direction, across another air gap to the bottom of the active field pole member 104c, up that field pole member to its top end, and finally across that air gap back to the South pole of "top" magnet 102b'. In one embodiment, the magnet flux traverses through only those components.

Figure 1D:
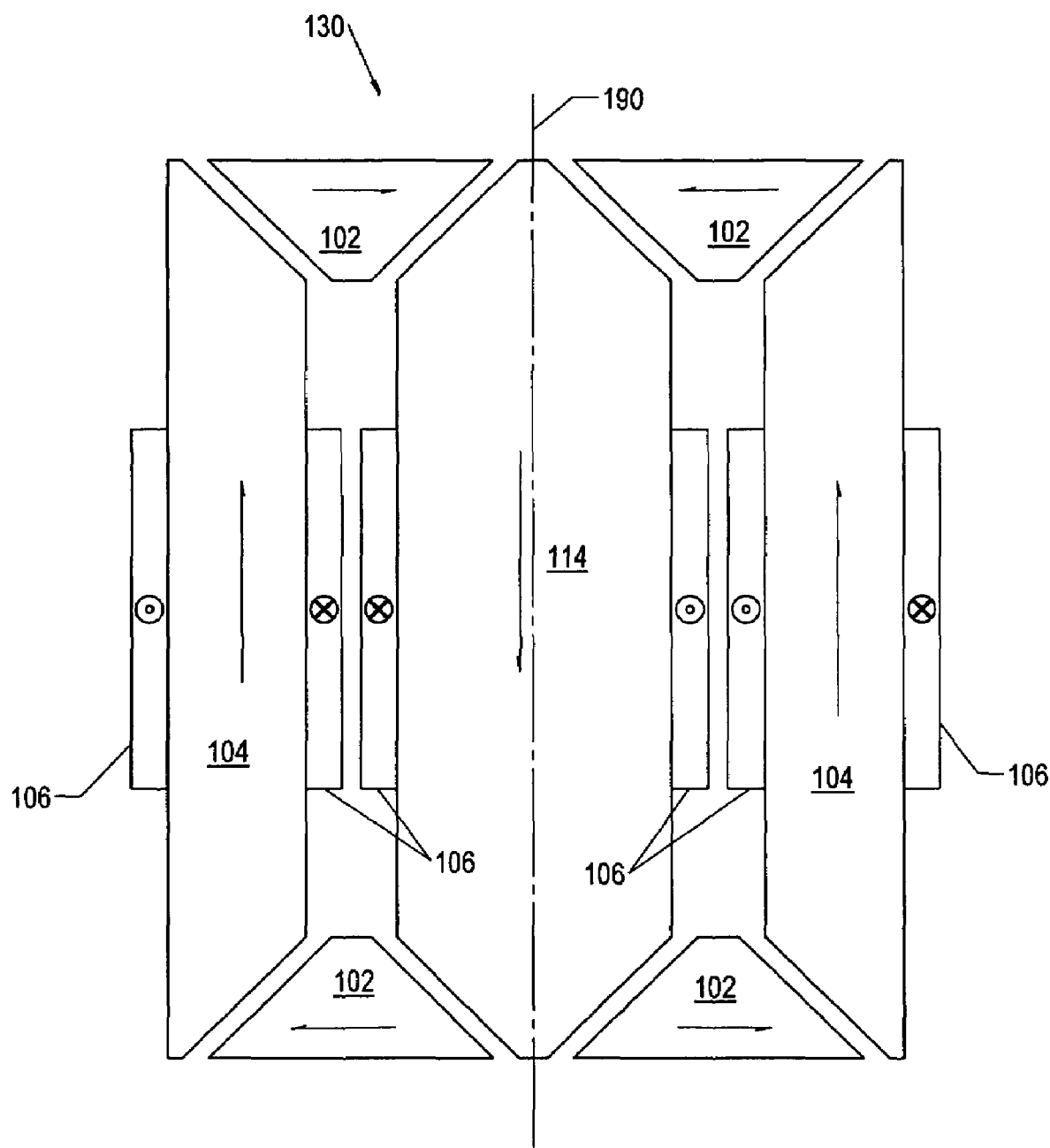

FIG. 1D illustrates yet another example of a motor module, according to yet another embodiment of the invention. Motor module 130 is configured to balance the side forces generated by magnets 102 that are typical in some arrangements of motor modules 100 (FIG. 1A) and 120 (FIGS. 1B and 1C). That is, magnets 102 can generate some side forces as the arrangements of magnets 102 are commutated between one group of field pole members 104 of one motor module 100 or 120 and another group of field pole members 104 for another motor module 100 or 120. This other group can be referred to as a neighboring group. As shown, two motor modules 100 of FIG. 1A are combined in a manner shown to form motor module 130. In particular, one of the field pole members 104 from each motor module 100 is replaced with a common field pole member 114. Note that while FIG. 1D shows coils 106 being wound about respective field pole members 104 and 114 to produce flux paths depicted by the arrows, coils 106 can be disposed about the field pole members in any number of ways.

Figure 1E:
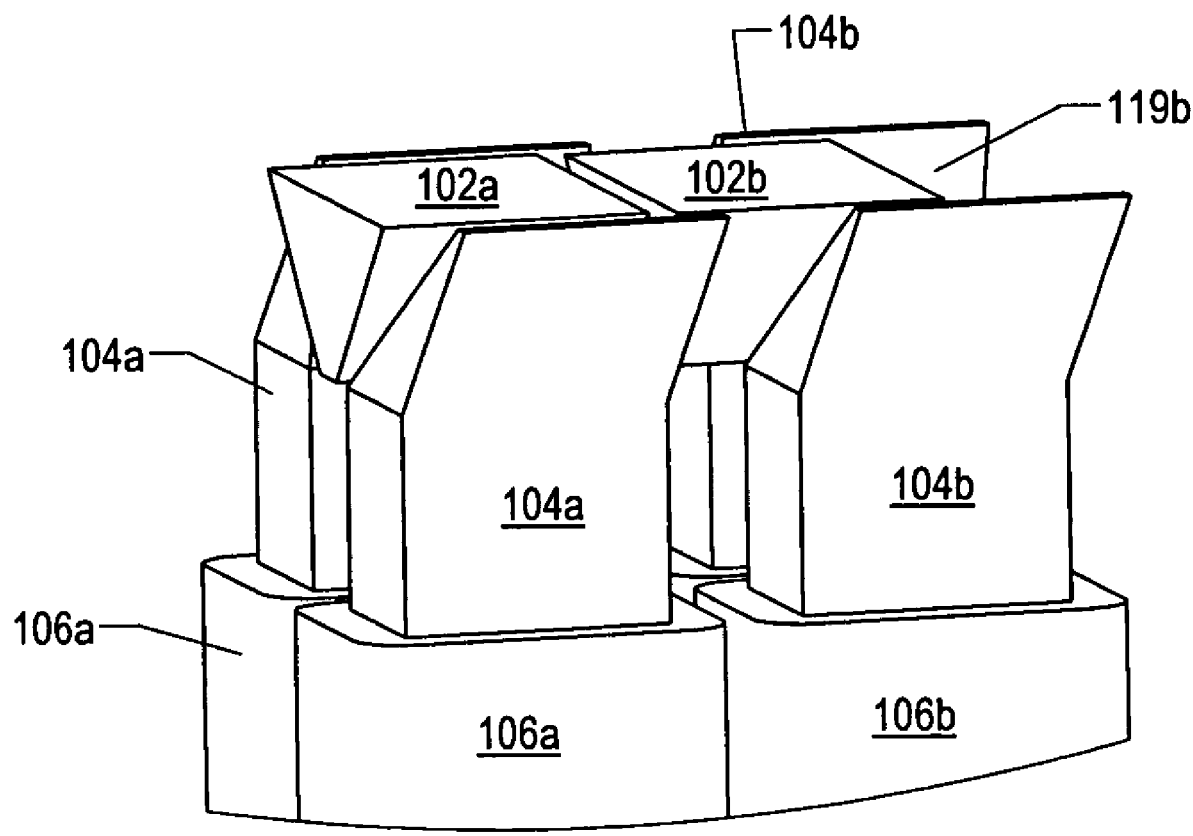
Figure 1F:
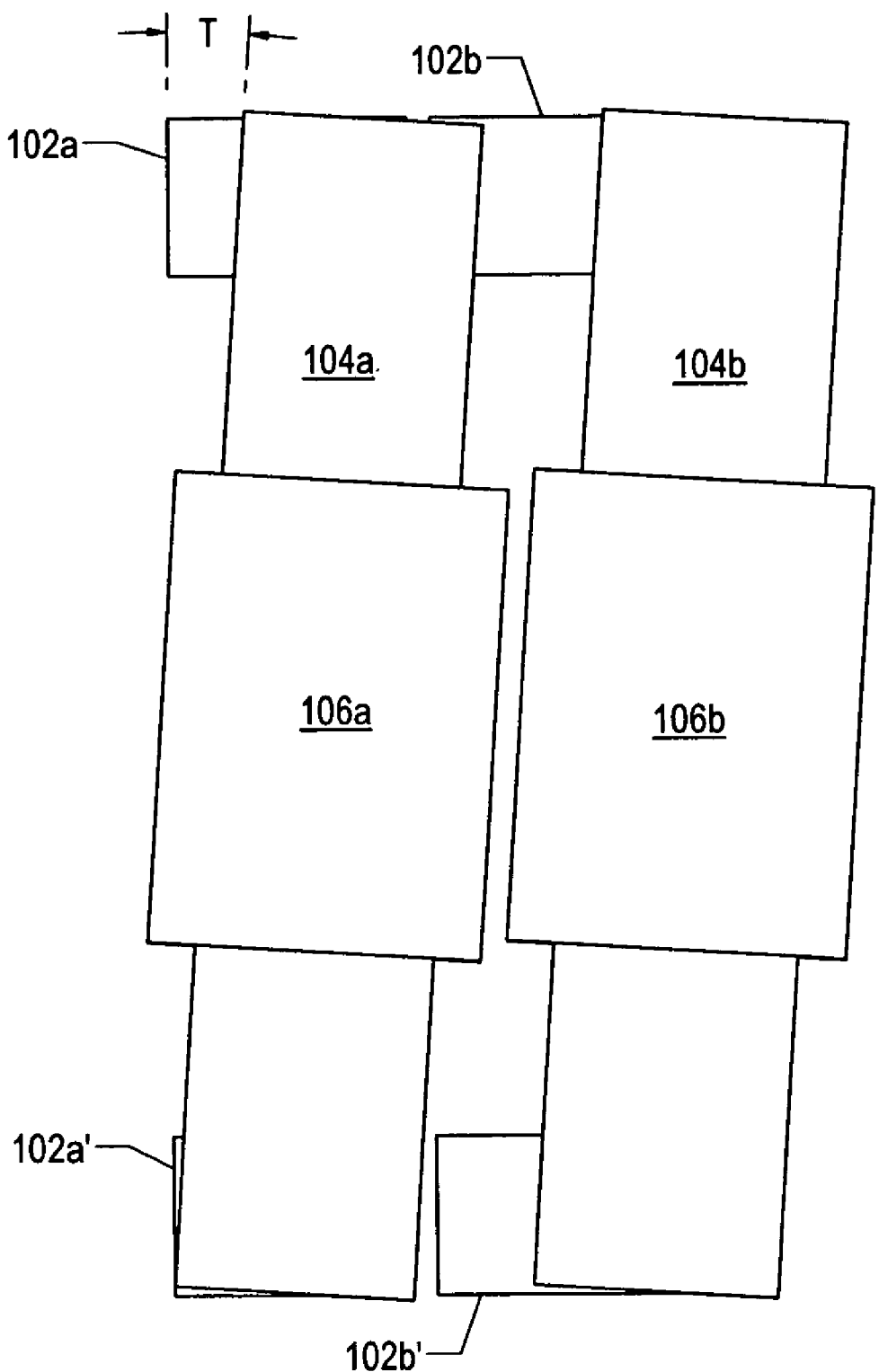
Figure 1G:
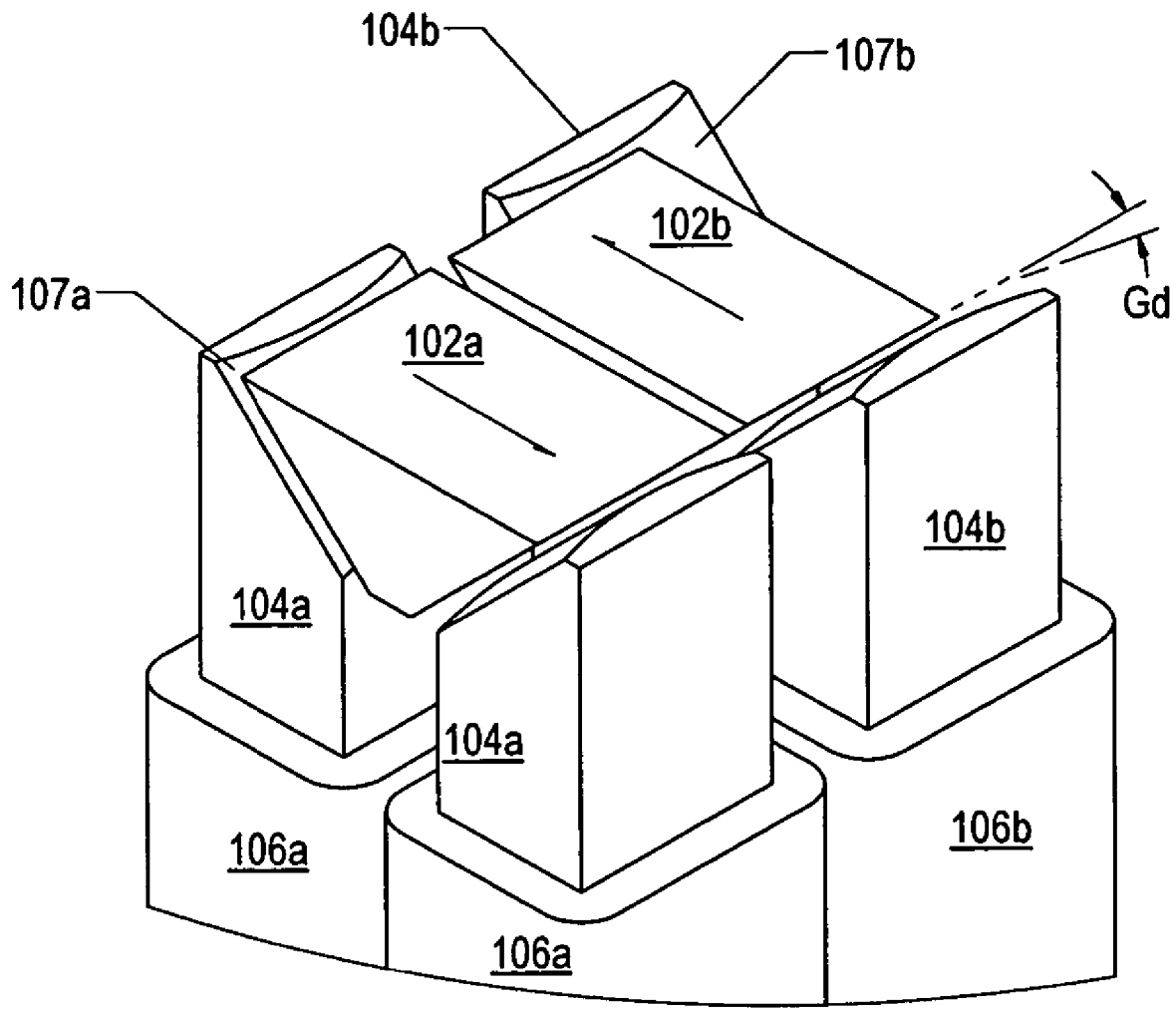

In rotary motors, the pole faces (i.e., the flux interaction surfaces) can be curved to fit the natural curvature of the circumference of the rotary motor. The flux interaction surfaces can also skewed for detent control as shown in FIG. 1E. For example, field pole member 104b of FIG. 1E includes a skewed flux interaction surface (or skewed pole face) 119b. Field pole members 104 can also be "tipped" by a tipped angle, "T," such that one end is advanced along the linear motor direction of motion as another method of controlling detent as shown in FIG. 1F. A third structure for reducing detent and a corresponding motor torque profile implements sculpted pole faces (i.e., sculpted flux interaction surfaces), where the gap distance, "Gd," varies with the travel position of the magnet as shown in FIG. 1G. For example, field pole members 104a and 104b include sculpted pole faces 107a and 107b, respectively.

FIG. 2 is a perspective view for an arrangement of a field pole module (i.e., a first group of field pole members) adjacent to a neighboring field pole module (i.e., a second group of field pole members), according to an embodiment of the invention. As shown, magnet 102a, field pole members 104a, and coils 106a constitute a motor module similar to that shown in FIG. 1A, whereas magnet 102b, field pole members 104b, and coils 106b constitute a neighboring or next motor module. Magnets 102a and 102b, in this example, are each shown to have a trapezoidal shape as viewed in the direction of motion. Multiple motor modules can be arranged together to form linear and large diameter motors.

FIG. 3 is an end view of one of a number of motor modules disposed in a linear motor, according to an embodiment of the invention. In this example, motor module 130 of FIG. 1D is implemented to form a linear motor. Motor modules 130 each are structurally positioned in relation to each other in a linear arrangement in which attachment member 302 couples magnets 102a from motor module 130 to other motor modules 130 (e.g., to those motor module magnets behind the one shown in FIG. 3, such as to magnet 102b shown in FIG. 2). Also, attachment member 302 is slideably in contact via a bearing means, such as bearing 306, to a rigid stationary support member 304. Similarly, attachment member 302 couples magnets 102a' from motor module 130 to other motor module magnets (not shown) that are similar or substantially similar to magnets 102a'. Attachment member 302 is slideably in contact via a bearing means, such as bearings 326, to a rigid stationary support member 324. Note that in specific embodiments, field pole members 104 and 114 are affixed to one or more stationary support members 328, which are normally made of non-magnetic materials. Rigid stationary support member 304 and rigid stationary support member 324 can be composed of either magnetic or non-magnetic material. In various embodiments, attachment member 302 is normally made of non-magnetic materials. Note that in at least one embodiment, support member 324 can be omitted if the support member 304 includes a rail system (not shown) or other equivalent support structures.

Figure 4:
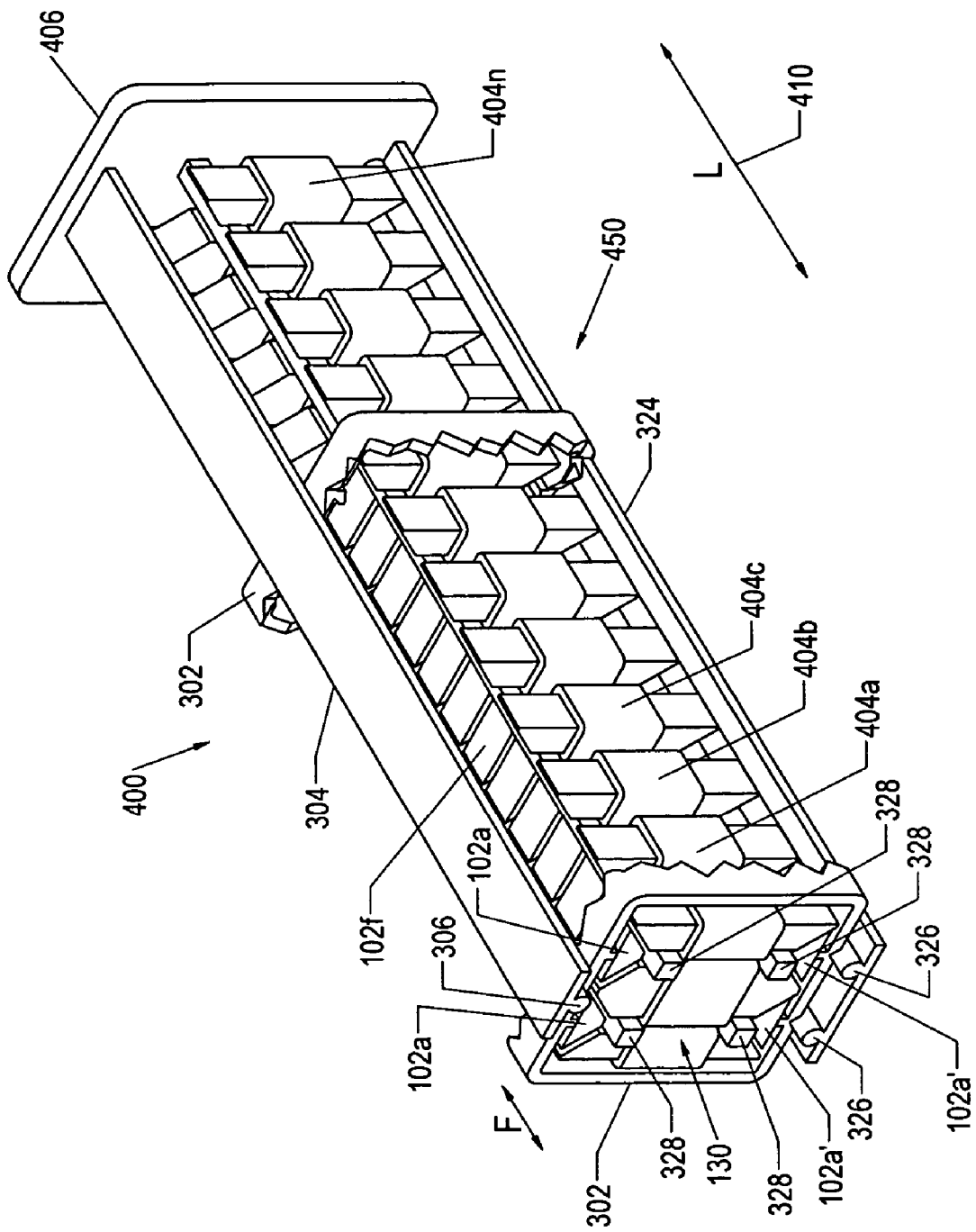
FIG. 4 is a perspective view of a linear motor implementing motor modules equivalent to that shown in FIG. 1D, according to an embodiment of the invention.

FIG. 4 is perspective view of a linear motor implementing motor modules 130 (FIG. 1D), according to an embodiment of the invention. Linear motor 400 has an end view 300 as shown in FIG. 3. Further, linear motor 400 includes any number of other motor modules 404a, 404b, 404c through to motor module 404n. The first motor module 130 and other motor modules from 404a, 404b, 404c through to motor module 404n are coupled with each other with support members 304 and 324 to form stationary linear member 450. In one embodiment, the ends of support members 304 and 324 can be affixed to stationary end plate 406. Magnets 102 are attached to, and are coupled with, attachment member 302, which can take the form of a rectangular tube. The middle portion of attachment member 302 is not shown for clarity. Attachment member 302 is configured to translate in a linear direction ("L") 410 relative to rigid stationary member 304 and rigid stationary support member 324. In various embodiments, the linear forces created in structure 302 are conveyed to a desired load (not shown) through appropriate attachments. In one embodiment, the field pole module pitch length (i.e., the distance between motor modules 404a, 404b, 404c through to motor module 404n) is determined by the linear motor application requirements. Note that while a magnet array pitch length 505 of FIG. 5 might not be equal to field pole module pitch length 506 of FIG. 5, magnet array pitch length 505 can be determined by the application and the commutation schedule, such as that depicted in FIG. 5.

Figure 5:
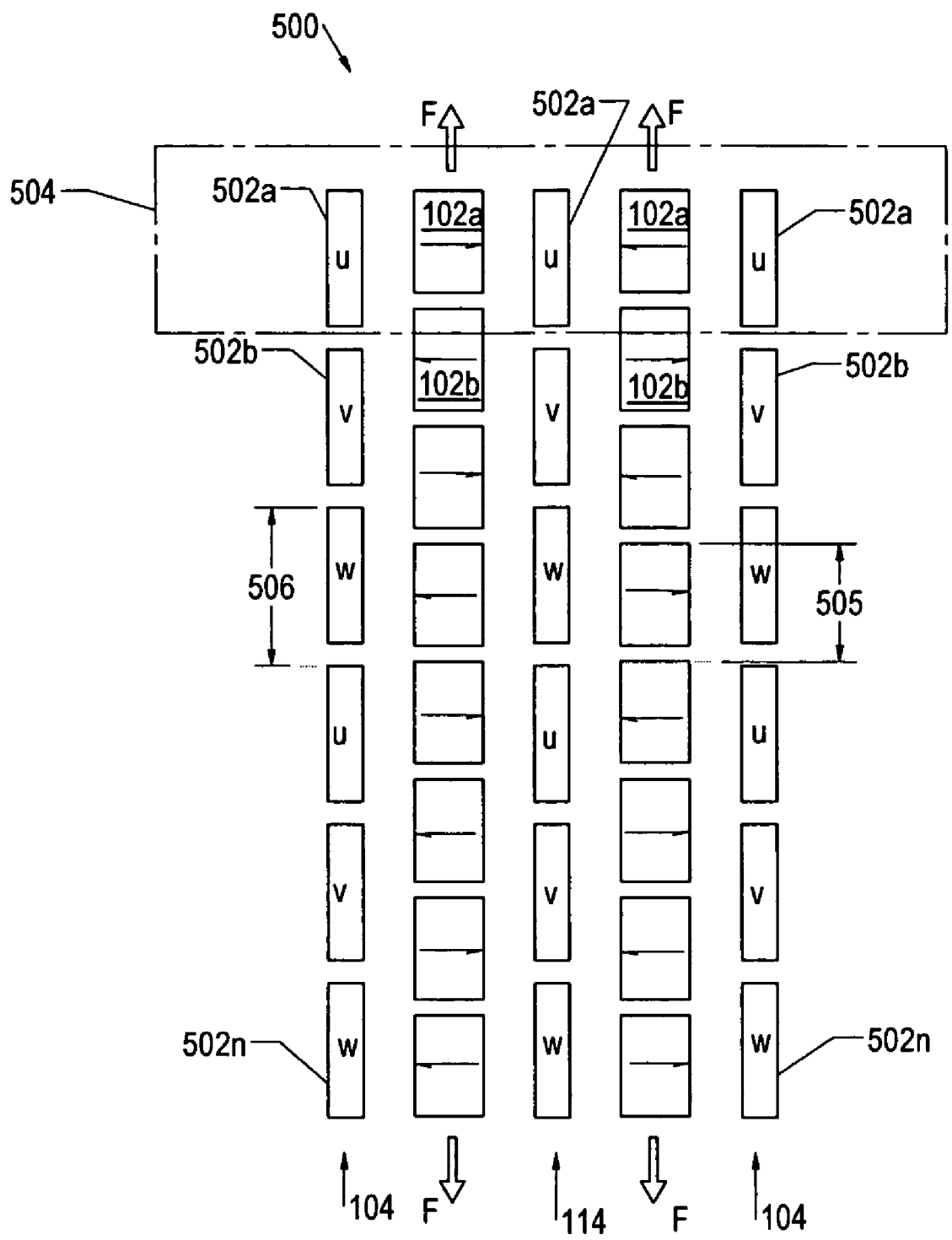
FIG. 5 is a diagram showing the use of multiple phases to energize coils for a linear motor, according to an embodiment of the invention.

FIG. 5 is a diagram showing the use of three phases to energize coils to commutate linear motor 400 of FIG. 4, according to one embodiment of the invention. FIG. 5 is a top view of the upper portions of field poles 104 and 114 and magnets 102 of FIG. 3. The groups of field pole members 104 and 114 that form field pole modules are designated as groups 502a through 502n. Further, each of the groups is also associated with one of the indicia "U," "V," and "W." These indicia describe the electrical phases connected to the coils (not shown) wound on those field pole members. Examples of such coils are shown as coils 106 of FIG. 3. FIG. 5 also shows a top view of magnets 102 for motor modules 504. The coils for groups of field pole members 502a to 502n are energized so as to cause magnetic field potentials to appear at the pole faces (i.e., flux interaction surfaces) at both ends of each active field pole member. In one embodiment, three-phase sine wave commutation is applied to the coils. In other embodiments, other common drive schemes can be used for such commutation.

Magnets 102 of motor modules 504 are spaced apart in linear sequence and move in a linear direction by the sequential interaction of the permanent magnet magnetic fields and the flux interaction region adjacent the pole faces of the active field poles. By energizing the coils, a linear force, F, develops in one of the directions shown by the arrows. Note that while FIG. 5 depicts a magnet array pitch length 505 being shorter than field pole module pitch length 506, a magnet array pitch length 505 can also be longer than field pole module pitch length 506 or as otherwise determined by the application and the commutation schedule. Magnet array pitch length 505, together with the length of the magnets in the direction of motion, defines the spacing for the magnets. The magnetic polarity at the ends of the field pole member at any moment is determined by the current in the phases U, V and W. In a specific embodiment, those three magnetic polarities can be controlled by those skilled in the art to attract some permanent magnets 102 and repel others in a fashion that sequentially moves the magnet array in the desired linear direction, consequently applying a force on magnet support structure 302 of FIG. 3 in that direction. In large rotary motor implementations, diagram 500 of FIG. 5 is not linear, but forms a circular path with alternating U, V, and W phases around a circumference around a central axis which, in one embodiment, contains a shaft which is connected to magnet support structure 622 and 632 in FIG. 6.

FIG. 6 is a perspective view of a relatively large rotary motor implementing motor modules 130 (FIG. 1D), according to an embodiment of the invention. Rotary motor 600 includes magnet supports 622 and 632, both of which are coupled together by a shaft 620. Rotary motor 600 also includes any number of motor modules, one of which is shown as motor module 602. FIG. 6 shows two of four or more field pole support structures 604 for motor module 602. Field pole support structures 604 can be attached to an external stationary shell or other stationary object (not shown). In various embodiments, support structures 604 can be constructed from non-magnetic materials. Notably, magnets 102a are mounted to magnet support 622 and magnets 102a' are mounted to magnet support 632. As such, magnets 102a and 102a' are configured to rotate about or with shaft 620, whereas field pole members 104a, 104b and 114 are configured to remain stationary in space to form a stator or a stator portion of rotary motor 600. One pair of field pole supports 604 are shown in part in one embodiment to show how the modules 602 can be attached to a stationary outer shell (not shown). In one embodiment, magnet supports 622 and 632 can be composed of a pair of non-magnetic, non-conducting disks. In at least one embodiment, magnets 102a and 102a' can be rectangular in shape as viewed along the axis of a motor, but are trapezoidal in shape when viewed in any plane that contains the axis. The angled sides of magnets 102a and 102a' can form an angle, for example, at +/−45° (or any other angle) from the longest side of the trapezoidal magnets. In the case of a rotary motor 600, which can use the same motor modules used in linear motors, the diameter of the centerline passing through each magnet of a magnet array (i.e., the distance from the axis to a radius that passes through the center of magnets 102 in a magnet array, or, alternatively, the distance from the axis to the centerline of motor modules 602) is determined by the torque requirements of the motor application. Advantageously, the diameter of rotary motor 600 can increase without adding back-iron material.

In a specific embodiment, rotary motor 600 includes a minimum of six motor modules 602 and could use as many as desired for a given application. Each motor module 602 includes a group of field pole members that can include an active field pole at the mean radius of motor modules 602 (i.e., the radius passing through field pole members 114) plus active field pole members 104 at inner and outer diameters of motor modules 602. The two outermost active field poles 104 can be offset in the direction of rotation to reduce detent. When aligned with a given magnet, one flux path can be established as set forth in the following example with respect to motor module 602. The flux path extends from the North pole face (e.g., the 45° angled surface) of magnet 102a radially to outer active field pole 104a. The flux path continues down active field pole 104a to the other end near magnet 102a', passing radially inward to the South pole face of a "bottom" magnet 102a'. The flux path then passes through that bottom magnet 102a', up the inner active field pole 114 to the top pole face (i.e., flux interaction surface), radially across the top air gap back to the source "top" magnet 102a. In a specific embodiment, magnet flux traverses only through those components.

Figure 7:
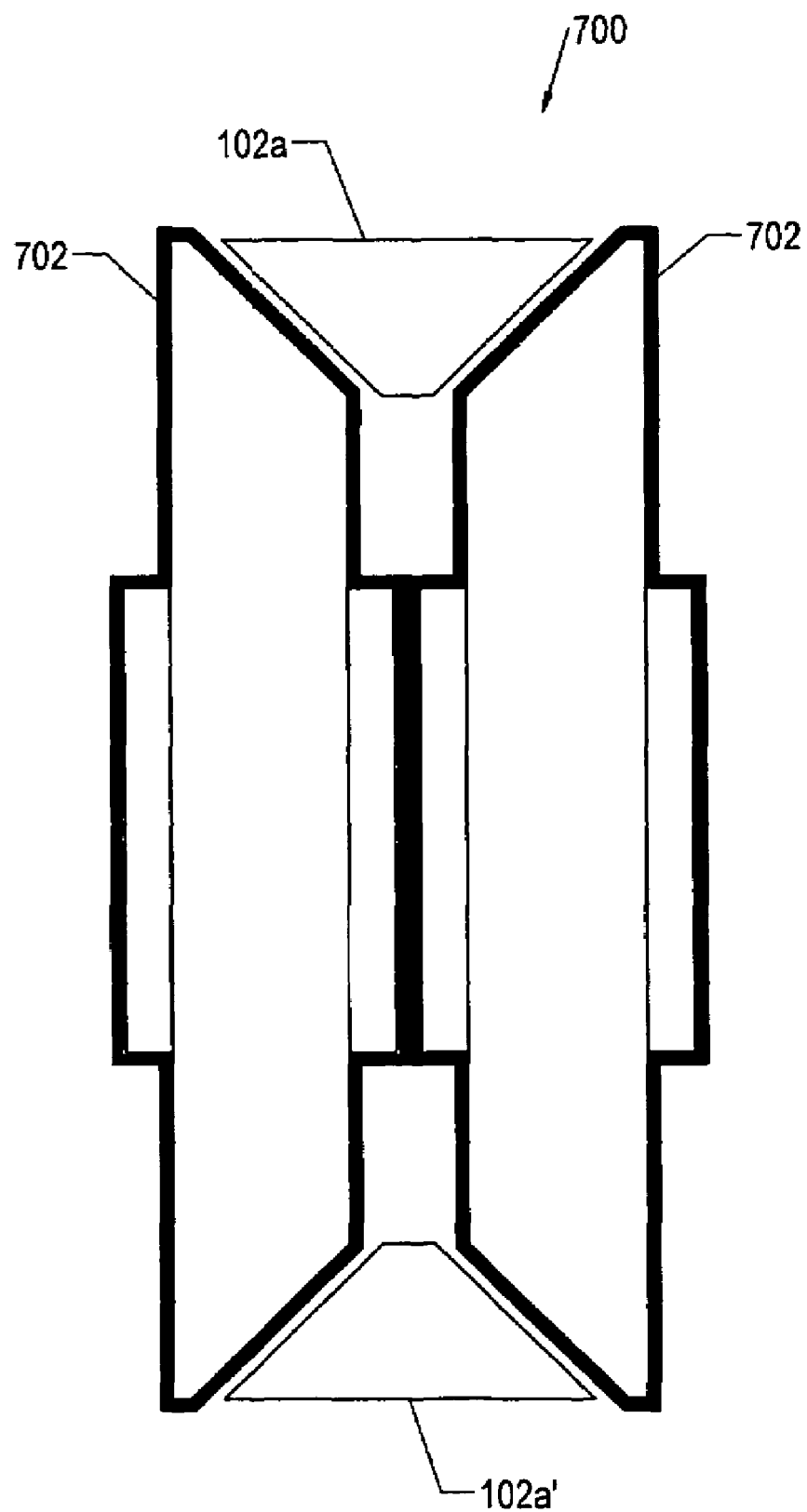
FIG. 7 depicts a coolant jacket for providing cooling in accordance with one embodiment of the invention.

FIG. 7 depicts a coolant jacket for providing cooling in accordance with one embodiment of the invention. Coolant jackets 702 can be placed around the coils and/or active field pole members of a motor module 700 to encapsulate a cooling medium into which thermal energy from the coils can be transferred. Such cooling jacket 702 can occupy some portion of the air gap at the ends of the field pole members.

While a practitioner of ordinary skill in the art should require no additional explanation in making or using the embodiments of the motor module structures described herein in reference to linear and/or rotary motors, one may nevertheless find some helpful guidance by examining the following references in order from most to least preferred: "IEEE 100: The Authoritative Dictionary of IEEE Standard Terms," Institute of Electrical and Electronics Engineers (Kim Breitfelder and Don Messina, eds., 7th ed. 2000), "General Motor Terminology," as defined by the Small Motors and Motion Association ("SMMA"), and "Standard Specifications for Permanent Magnet Materials: Magnetic Materials Producers Association ("MMPA") Standard No. 0100-00," International Magnetics Association.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments related to a motor, the discussion is applicable to all electrodynamic machines, such as to a generator. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. An electrodynamic machine comprising:
a plurality of motor modules for implementing linear and rotary electrodynamic machines to produce a force in a direction of motion, each motor module comprising:
magnets having confronting magnetic surfaces, said magnets further comprising:
a first portion of a first array of said magnets, and
a second portion of a second array of said magnets, said magnets in each of said first portion and said second portion having directions of polarization in substantially opposite directions, with said confronting magnetic surfaces of said first portion facing said confronting magnetic surfaces of said second portion; and
field pole members including one or more coils to form active field pole members for generating ampere-turn flux therein, each of said field pole members being substantially straight, said active field pole members further comprising:
at least two outer active field pole members each having one flux interaction surface at each end, and
an inner active field pole member having two flux interaction surfaces at each end, said flux interaction surfaces being configured to define air gaps in relation to said confronting magnetic surfaces, said air gaps being substantially coincident with at least one angle that is non-orthogonal to the predominant direction of said ampere-turn flux,
wherein said motor module is configured to produce closed flux paths that omit back-iron.

2. The electrodynamic machine of claim 1 wherein said plurality of motor modules are arranged adjacent to each other so that:
active field pole members from one or more motor modules of said plurality of motor modules magnetically couple to:
magnets associated with one or more other motor modules of said plurality of motor modules to produce said force.

3. The electrodynamic machine of claim 1 further comprising a linear motor when said plurality of motor modules are each arranged in a line,
wherein said motion is translational.

4. The electrodyamic machine of claim 1 further comprising a rotary motor including an axis of rotation, said plurality of motor modules are each arranged coaxially to said axis,
wherein said motion is rotational.

5. The electrodynamic machine of claim 1 wherein each of said motor modules further comprises a cooling jacket.

* * * * *